United States Patent
Flordelis et al.

(10) Patent No.: US 12,149,323 B2
(45) Date of Patent: Nov. 19, 2024

(54) METHODS FOR RECEIVE BEAM SELECTION, RELATED RECEIVER NODE AND RELATED TRANSMITTER NODE

(71) Applicant: Sony Group Corporation, Tokyo (JP)

(72) Inventors: Jose Flordelis, Lund (SE); Fredrik Rusek, Eslöv (SE); Erik Bengtsson, Eslöv (SE); Olof Zander, Södra Sandby (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 85 days.

(21) Appl. No.: 17/760,960

(22) PCT Filed: Sep. 2, 2020

(86) PCT No.: PCT/EP2020/074484
§ 371 (c)(1),
(2) Date: Mar. 16, 2022

(87) PCT Pub. No.: WO2021/063621
PCT Pub. Date: Apr. 8, 2021

(65) Prior Publication Data
US 2022/0345200 A1    Oct. 27, 2022

(30) Foreign Application Priority Data
Oct. 4, 2019  (SE) .................... 1951135-1

(51) Int. Cl.
*H04B 7/10* (2017.01)
*H04B 7/06* (2006.01)
*H04B 7/08* (2006.01)

(52) U.S. Cl.
CPC ............. *H04B 7/10* (2013.01); *H04B 7/0695* (2013.01); *H04B 7/088* (2013.01)

(58) Field of Classification Search
CPC ......... H04B 7/10; H04B 7/0695; H04B 7/088
(Continued)

(56) References Cited

U.S. PATENT DOCUMENTS

2015/0341105 A1  11/2015  Yu
2016/0087765 A1  3/2016  Guey
(Continued)

FOREIGN PATENT DOCUMENTS

EP    2797240 A1 * 10/2014  ........... H04B 7/0639
WO    2017061744 A1    4/2017
(Continued)

OTHER PUBLICATIONS

Sony, "Enhancements on multi-beam operation" [online], 3GPP TSG RAN WG1 #98 R1-1908784, Aug. 17, 2019, Internet<URL:https://www.3gpp.org/ftp/tsg_ran/WG1_RL1/TSGR1_98/Docs/R1-1908784.zip>.
(Continued)

*Primary Examiner* — Kevin M Burd
(74) *Attorney, Agent, or Firm* — Tucker Ellis LLP

(57) ABSTRACT

A method is disclosed performed by a transmitter node, for enabling reception beam selection at one or more receiver nodes. The method comprises obtaining a polarization profile, wherein the polarization profile defines a respective polarization for a sequence of probing occasions. The method comprises transmitting a pilot signal in each probing occasion of the sequence of probing occasions according to the polarization profile, in one single transmission beam. The polarization profile defines a first polarization to be used in N probing occasions and a second polarization to be used in M probing occasions in the sequence of probing occasions, where M is smaller than N and M is non-zero.

16 Claims, 10 Drawing Sheets

(58) Field of Classification Search
USPC .......................................................... 375/262
See application file for complete search history.

(56) References Cited

U.S. PATENT DOCUMENTS

| 2016/0337056 A1 | 11/2016 | Frenne |
| 2019/0253211 A1 | 8/2019 | Kakishima |
| 2020/0329374 A1* | 10/2020 | Kampeas ............ H04W 12/047 |

FOREIGN PATENT DOCUMENTS

| WO | 2017196246 A2 | 11/2017 | |
| WO | 2018017920 A1 | 1/2018 | |
| WO | 2018044460 A1 | 3/2018 | |
| WO | 2018064348 A1 | 4/2018 | |
| WO | WO-2018064399 A | 4/2018 | |
| WO | WO-2019110123 A1 * | 6/2019 | ........... H04B 7/0469 |

OTHER PUBLICATIONS

International Search Report from corresponding International Application No. PCT/EP2020/074484, mailed on Nov. 23, 2020, 3 pages.
Samsung, "MIMO/beamforming for 5G new radio interface for over-6GHz: system architecture and design aspects," 3 GPP TSG RAN WG1 #84bis, R1-162183, Apr. 11-15, 2016, 7 pages.

* cited by examiner

METHODS FOR RECEIVE BEAM SELECTION, RELATED RECEIVER NODE AND RELATED TRANSMITTER NODE

The present disclosure pertains to the field of wireless communications. The present disclosure relates to a method for enabling reception beam selection at one or more receiver nodes, a method for selecting a reception beam to be used when communicating with the transmitter node, a related transmitter node and a related receiver node.

BACKGROUND

Wireless communication systems operating at millimeter-wave frequencies, such as, tens of GHz, typically require beamformed transmissions to overcome large pathlosses. A beam-pair, such as a transmitter-side spatial filter (which may be referred to as a transmit beam or transmission beam) and a receiver-side spatial filter (which may be referred to as a receive beam or reception beam) that provides a suitable link, which may also be referred to as a channel, between the transmitter and the receiver may therefore have to be selected. During an initial beam selection and a subsequent beam adjustment procedure, several candidate beam-pairs may be probed, the candidate beam-pair offering the largest channel gain is typically selected for transmission. Optimal beam selection by dual-polarization as well as single-polarization capable communicating devices requires a probing of two orthogonal polarization modes for each candidate beam-pair. However, initial beam selection and beam adjustment procedures as currently defined in 3GPP rely on single-polarization transmissions, wherein the selection of the transmit polarization state is transparent to the other link-end.

This situation is problematic since the candidate beam-pair offering the largest channel gain, if probed at the transmitter with a single polarization mode, does not necessarily offer the largest capacity for transmission with two orthogonal polarization modes, nor is it optimal for selection of a beam-pair intended for single polarized transmissions.

SUMMARY

Accordingly, there is a need for nodes and methods for reception beam selection, which mitigate, alleviate or address the shortcomings existing and provide a more efficient procedure for reception beam selection.

A method is disclosed, performed by a transmitter node, for enabling reception beam selection at one or more receiver nodes. The method comprises obtaining a polarization profile. The polarization profile defines a respective polarization for a sequence of probing occasions. The method comprises transmitting, a pilot signal in each probing occasion of the sequence of probing occasions according to the polarization profile, in one single transmission beam. The polarization profile defines a first polarization to be used in N probing occasions and a second polarization to be used in M probing occasions in the sequence of probing occasions, where M is smaller than N and M is non-zero.

Further, a method is disclosed, performed by a receiver node, for selecting a reception beam to be used when communicating with a transmitter node. The method comprises obtaining a polarization profile defining a respective polarization for each probing occasion in a sequence of probing occasions used by the transmitter node for pilot signal transmission in one single transmission beam. The polarization profile defines a first polarization to be used in N first probing occasions and a second polarization to be used in M subsequent probing occasions; where M is smaller than N and M is non-zero. The method comprises receiving, in a plurality of receive beams, pilot signals transmitted by the transmitter node with the first polarization in the first N probing occasions. The method comprises receiving, in a subset of the plurality of receive beams, pilot signals transmitted by the transmitter node with the second polarization in the M probing occasions. The method comprises selecting the reception beam from the subset of the plurality of receive beams, based on the pilot signals received with the first and the second polarization. The pilot signals transmitted may e.g. be beam reference signals.

Further, a transmitter node is provided, the transmitter node comprising a memory circuitry, a processor circuitry, and a wireless interface. The transmitter node is configured to perform a method as disclosed herein.

Further, a receiver node is provided, the receiver node comprising a memory circuitry, a processor circuitry, and a wireless interface. The receiver node is configured to perform a method as disclosed herein.

It is an advantage of the present disclosure that less resources need to be spent on initial beam establishment and subsequent beam adjustment compared to other state-of-the-art beam selection methods, while keeping a close-to-optimal beam selection accuracy.

The methods disclosed herein reduce the number of time slots required for performing beam selection of a reception beam, which may herein also be referred to as reception beam selection, while keeping the probability of large gain losses low.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
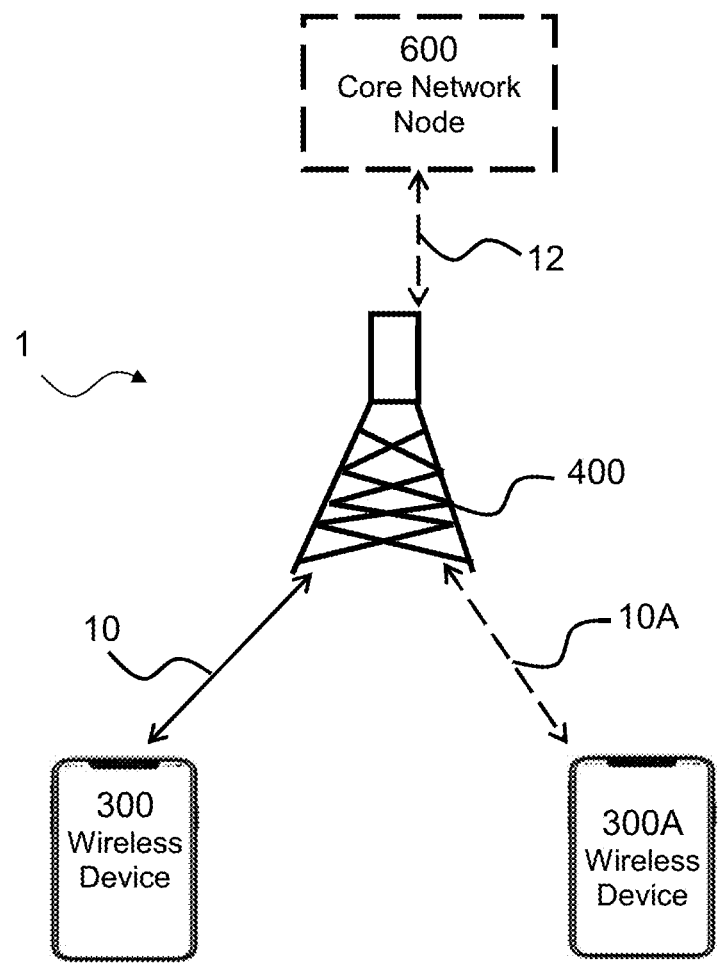
FIG. 1A is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1A is a diagram illustrating an exemplary wireless communication system 1 comprising an exemplary network node 400 and an exemplary wireless device 300 according to this disclosure. The exemplary wireless communication system may further comprise an exemplary core network node 600).

As discussed in detail herein, the present disclosure relates to a wireless communication system 1 comprising a cellular system, e.g. a 3GPP wireless communication system. The wireless communication system 1 comprises one or more wireless device(s) 300, 300A and/or one or more radio network node(s) 400, such as one or more of: a base station, an eNB, a gNB and/or an access point.

The network node disclosed herein may be seen as a functional unit which may include a radio access network node 400 operating in the radio access network, such as a base station, an evolved Node B (eNB), or a global NodeB (gNB) and/or a core network node 600.

A wireless device may refer to a mobile device and/or a user equipment (UE). Optionally, the wireless device may comprise an Internet-of-things (IoT) device.

The wireless device 300, 300A may be configured to communicate with the network node 400 via a wireless link (or radio access link or a radio channel) 10, 10A.

Figure 1B:
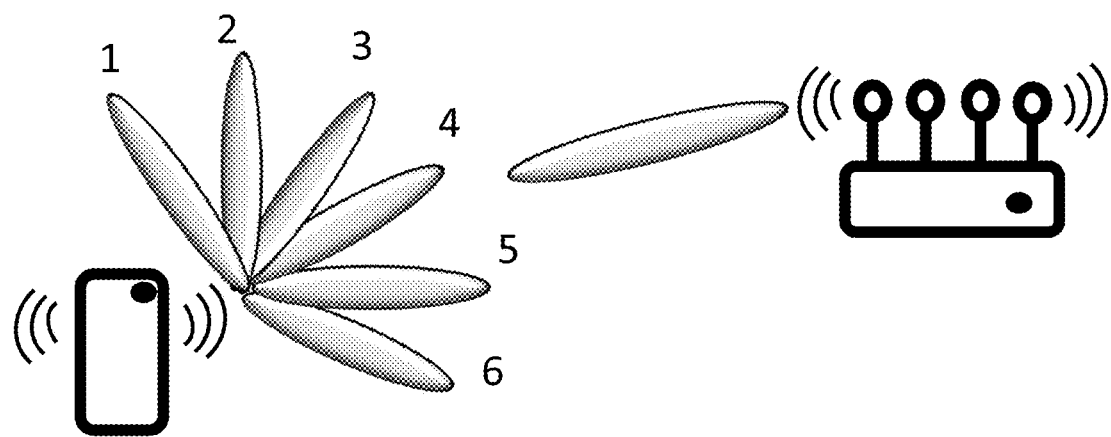
FIG. 1B is a diagram illustrating an exemplary transmitter node and an exemplary receiver node according to embodiments herein during a reception beam probing according to embodiments herein.
Figure 1C:
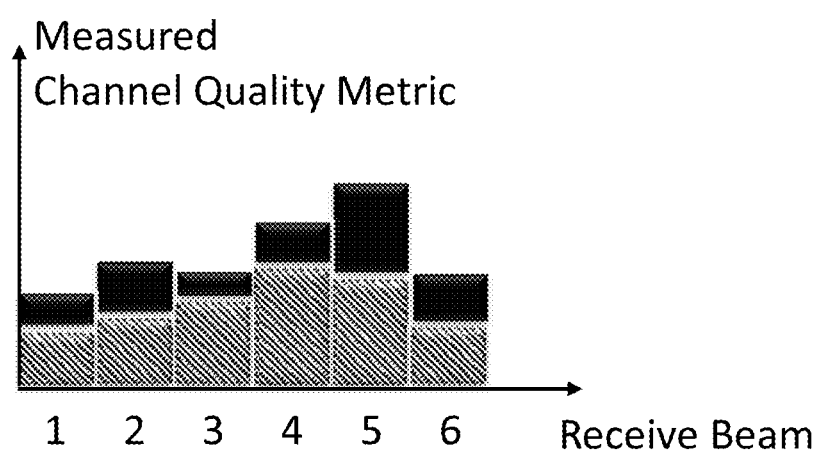
FIG. 1C is a graph illustrating a measured channel quality metric for a plurality of receive beams and two different polarizations of a transmit beam.

A likely scenario for a dual-polarization capable receiver node, such as e.g. the wireless device 400, is illustrated in FIG. 1B and FIG. 1C for the case of downlink (DL) candidate beam-pair probing. The same reasoning however also applies to uplink (UL) candidate beam-pair probing, wherein the receiver node may be a network node, such as the radio access network node 400.

In FIG. 1B, the receiver node listens to the transmitter node using six different receiver-side spatial filters, which may herein also be referred to as receive beams, labelled 1 through 6 in the figure. Transmissions from the transmitter node use a fixed spatial filter (e.g. a fixed beam). With the transmitter node transmitting using a single polarization state during the entire beam selection period, the receiver node may measure a quality metric of the channel, such as e.g. a channel gain, as marked with diagonal lines shown in FIG. 1C. Taller bars in FIG. 1C indicate better quality metrics of the channel, which may also be referred to as better channel quality metrics, such as e.g. larger channel gains. According to these measured channel quality metrics, the receiver node may sub-optimally select receiver node beam 4 to form a beam-pair with the transmitter node beam. This is due to the single polarization at the transmitter node, so that only the striped bar is measured and taken into account when selecting the receiver node.

However, since the transmission from the transmitter node may use two orthogonal polarization modes, the receiver node may measure both the diagonally striped channel quality metrics for a first polarization of the transmitter node beam plus the black-coloured channel quality metrics for a second polarization of the transmitter node beam as shown in FIG. 1C. Accordingly, after having measured both polarizations of the transmitter node beam, the receiver node may correctly select receive beam 5 to form a beam-pair with the transmitter node beam, which may herein also be referred to as a transmit beam, which is the optimal choice for dual-polarization capable devices. The selected receive beam may herein also be referred to as a receiving beam.

Figure 1D:
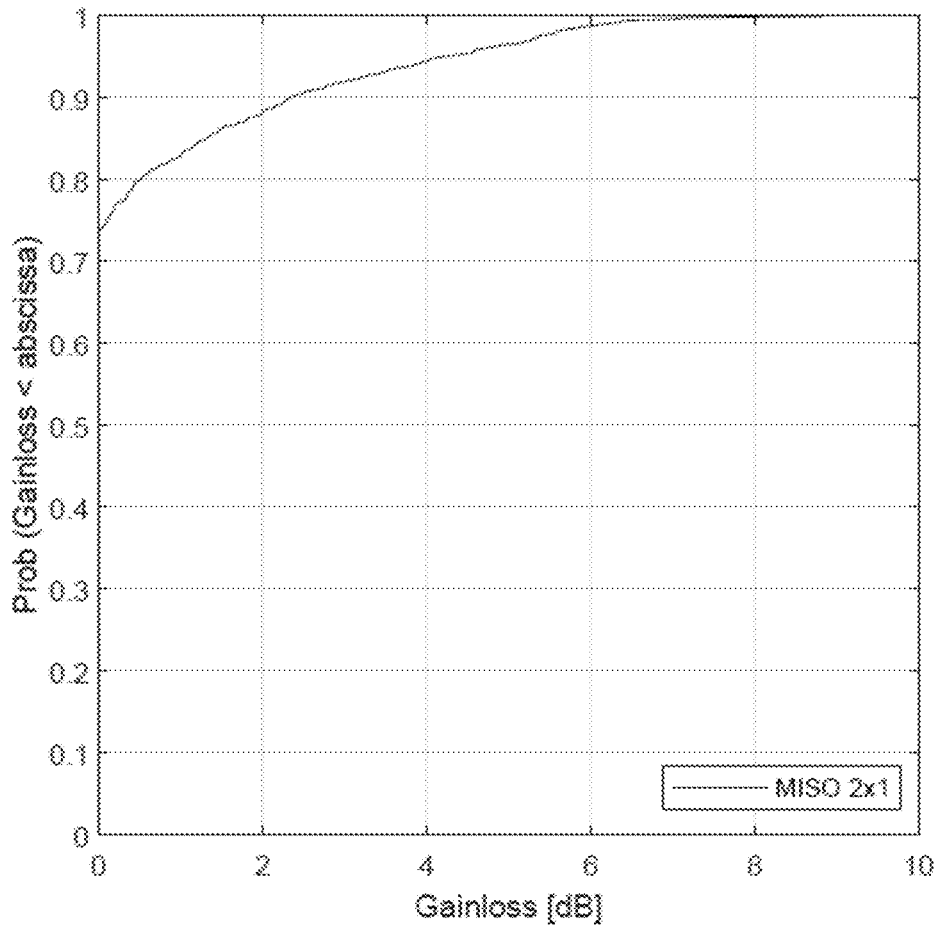
FIG. 1D is a graph illustrating a cumulative density function (CDF) of a gain loss resulting from a suboptimal beam selection with a known solution.

As illustrated in FIGS. 1B and 1C, beam selection and/or beam adjustment based on single-polarization observations by devices capable of dual-polarized transmission/receptions may lead to suboptimal beam choices and/or beam adjustment. Similarly, for single-polarization capable devices, the receiver node may select a beam-pair based on how well the polarization is aligned rather than on the capacity of the link. Studies performed by the inventors have revealed that such situations are not uncommon in practical setups. In FIG. 1D, the cumulative density function (CDF) of the gain loss resulting from a suboptimal beam selection due to single-polarization observations is shown for an urban micro-cell environment and 3GPP NR channel profile CDL-A. The probability of a gain loss of at least 2.5 dB is as large as 10%. Further, a non-optimal beam-pair is selected 25% of the time.

Figure 1E:
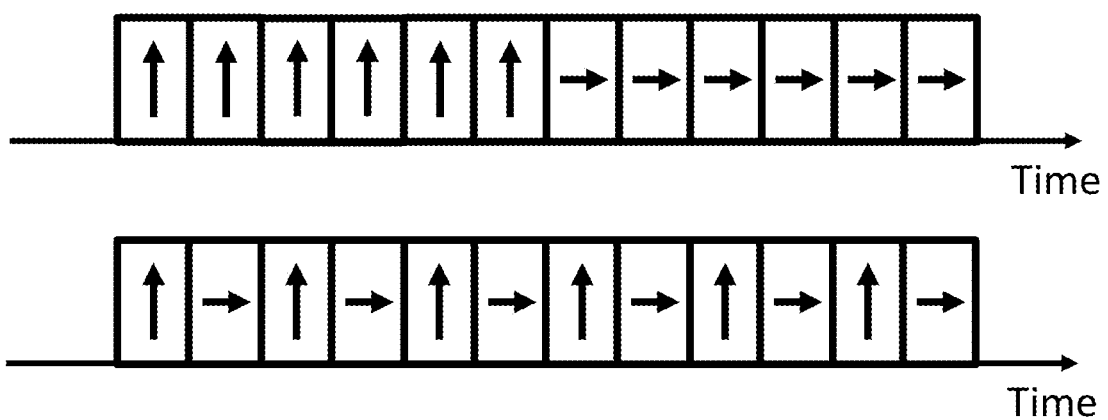
FIG. 1E is a diagram illustrating two polarization profiles known from prior art.
Figure 1F:
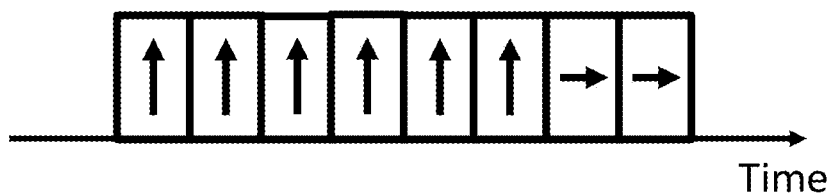
FIG. 1F is a diagram illustrating an exemplary polarization profiles according to the embodiments herein.

To reduce the probability of large gain losses in scenarios such as the ones described above, dual-polarized transmissions from the transmitter node may be used. FIG. 1E illustrates two sequences of beam polarization modes that are currently being used by the receiver node with transmissions from the transmitter node with a fixed transmitter-side spatial filter (both in DL and UL). Vertical and horizontal arrows in FIG. 1E indicate transmissions with mutually orthogonal polarization modes and at different time slots. In the example shown in FIG. 1E, twelve time slots are used to probe six dual-polarized candidate beam-pairs. In FIG. 1E a) the transmitter node transmits with a first polarization in the first six time slots and with a second polarization in the subsequent six time slots. The receiver node probes each of the receive beams for the first polarization and then continues to probe each of the receive beams for the second polarization. In FIG. 1E b) the transmitter node transmits with alternates between the first and the second polarization in subsequent time slots, i.e. transmits with the first polarization in time slots 1, 3, 5, 7, 9 and 11 and with the second polarization in time slots 2, 4, 6, 8, 10 and 12. The receiver node has to probe both polarizations with a first receive beam before it continues to the next receive beam until all of the receive beams have been probed.

In general, the number of time slots required for the probing of dual-polarized candidate beam-pairs, and the sequence of used polarization modes may depend on an implementation of the network node and on a current channel state. Consequently, the receiver node must be aware of the polarization profile currently used by the transmitter node.

In the following, a method is provided that allows for dynamic configuration of polarization profiles. The polarization profile may define a sequence of polarizations (or polarization modes), each to be used in a different time and/or frequency slot. The polarization profile may be hard coded in the transmitter and/or receiver nodes, such as in the radio network node 400 and/or wireless device 300 and may indicate how the transmitter node is to transmit the first and/or the second polarization of the beam. The polarization profile may also be defined and/or implemented by the transmitter node, such as the radio network node 400 and may be broadcasted from the transmitter node to one or more receiver nodes, such as the wireless devices 300 and 300A. The polarization profile may also be selected from a codebook, which codebook is known to both the transmitter and receiver nodes.

FIG. 1E discloses an example of the method disclosed herein in which the polarization profile specifies that the sequence of polarization modes of the transmissions from the transmitter node comprises six time slots in which the transmission is performed with a first polarization followed by two time slots in which the transmission is performed with a second polarization. The receiver node probes or measures the transmissions from the transmitter node with a fixed transmit beam in the time slots with the first polarization, such as the first six time slots in this example, to obtain single-polarization estimates of a channel quality metric, in this example a channel gain, such as a downlink channel gain or an uplink channel gain, for each of the six receiver node candidate beams, such as beam 1 through beam 6. After this first set of measurements, the receiver node may decide to disregard a number of candidate beams based on the estimated gain for each beam (as shown in FIG. 1C). In this example the receiver node may disregard candidate beams 1, 2, 3 and 6 since these beams have a lower estimated channel gain than the candidate beams 4 and 5. The receiver node then measures the channel gain of the remaining candidate beams 4 and 5 for transmissions from the transmitter node using the same transmitter-side spatial filter as for the first transmission but in a different polarization mode, such as in a polarization mode orthogonal to the first polarization mode. Based on the measurements of the second polarization the wireless device may determine that beam candidate 5 (in the example shown in FIG. 1C) displays the largest channel gain. Thereby the number of time slots required to (near optimally) probe six dual-polarized candidate beam-pairs can be reduced from twelve time slots for the current solutions to eight time slots.

In some embodiments the receiver node may discard candidate receive beams that have an estimated channel gain more than a certain threshold lower than the strongest receive beam candidate, e.g. having the highest estimated channel gain, after performing the probing of the transmissions having the first polarization. Studies performed by the inventors have shown that under some conditions beam-pair candidates having estimated channel gains that are more than 8 dB below the strongest estimated beam-pair do not need to be measured using the second polarization mode, such as an orthogonal polarization mode, since this beam-pair candidates will likely not be one of the strongest candidates after the probing of the second polarization and can therefore be disregarded. By performing the method disclosed herein, the probability of selecting the wrong beam-candidate may be reduced e.g. to 2%.

Figure 2:
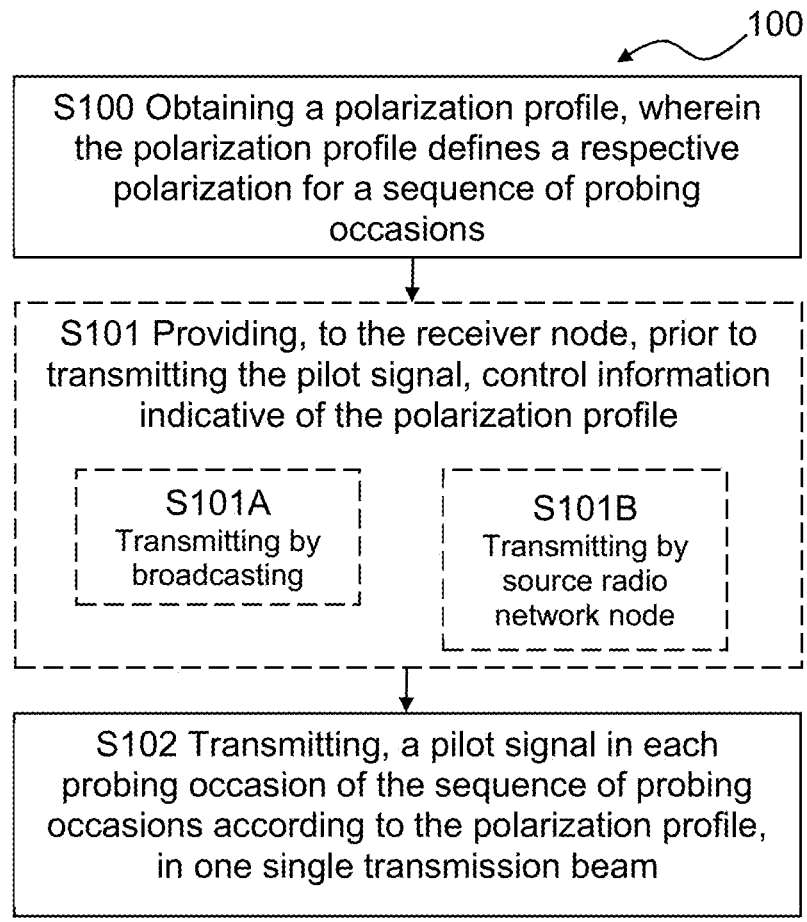
FIG. 2 is a flow-chart illustrating an exemplary method, performed in a transmitter node, for enabling reception beam selection at one or more receiver nodes according to the disclosure.

FIG. 2 shows a flow diagram of an exemplary method 100, performed by the transmitter node (e.g. a transmitter node disclosed herein, e.g. transmitter node 500), for enabling reception beam selection at one or more receiver nodes according to the disclosure.

The method 100 comprises obtaining S100 a polarization profile, wherein the polarization profile defines a respective polarization for a sequence of probing occasions. In one or more embodiments, the transmitter node may e.g. be a radio network node, such as an eNB or a gNB. In one or more embodiments, the transmitter node may be a wireless device, such as a UE. The polarization profile defines a first polarization to be used in N probing occasions and a second polarization to be used in M probing occasions in the sequence of probing occasions, where M is smaller than N and M is non-zero. This may also be referred to as the polarization profile being asymmetric with regards to the time slots. The N probing occasions in the first polarization may occur before the M probing occasion in the second polarization. The first polarization may be different from the second polarization. The polarization of the pilot signals may be a linear polarization, a circular polarization, and/or an elliptical polarization. The first polarization may be orthogonal or perpendicular to a second polarization. In some embodiments, the first polarization may be orthogonal to the second polarization. The polarization of the transmit beam may be indicated in an overhead transmission of each beam. Each transmission during a beam sweep may e.g. comprise synch, beam ID, cell info etc., furthermore according to embodiments herein the polarization may be implemented as a single bit in the overhead of the transmission. Each beam transmission may comprise an indication whether it is one of the M or one of the N transmissions. In some embodiments it may also comprise an indication as to which transmission in the sequence it is (e.g. N1, N2 or M3, etc.). Thereby the receiver node may determine if it is measuring one of the M or one of the N transmissions, and also which specific transmission out of the one N or M transmissions.

In some embodiments, the polarization profile may be pre-defined, e.g. in a polarization codebook. The transmitter node may obtain S100 the polarization profile by e.g. retrieving the polarization profile from a memory, e.g. by selecting a polarization profile from a polarization codebook. The polarization codebook may be stored on a memory accessible by the transmitter node. In some embodiments, the polarization profile and/or the polarization codebook, and thus N and M, may be pre-agreed between the transmitter node and the receiver node, e.g., mandated in a standard.

In some embodiments, the transmitter node may obtain the polarization profile by e.g. generating the polarization profile. The polarization profile may be generated based on an algorithm. The number of probing occasions N for the first polarization may e.g. be determined based on a maximum number of receive beams at the one or more receiver nodes. The transmitter node may then determine an optimal number of probing occasions M to minimize erroneous beam selections in the system. This may be done dynamically and there may be a trade-off between additional overhead and minimizing errors.

In the event of a DL transmission during a handover operation, where the wireless device moves from a first radio network node, referred to as a source radio network node, to a second radio network node, referred to as a target radio network node, the transmitter node may be the target radio network node. In this scenario, the transmitter node may obtain the polarization profile from a second network node, such as the source radio network node. The source radio network node may inform the target radio network node, which is the transmitter node, about the polarization profile currently used by the source radio network node and the receiver node.

In some embodiments, the transmitter node may obtain the polarization profile by receiving the polarization profile from the receiver node. This may e.g. be the case when the transmission is an UL transmission, i.e. when the transmitter node is a wireless device and the receiver node is a radio network node, and the radio network node indicates to the wireless device which polarization profile the wireless device should use for the UL transmission or for beam probing.

The method 100 comprises transmitting S102 a pilot signal in each probing occasion of the sequence of probing occasions according to the polarization profile, in one single transmission beam. For example, the pilot signals in the sequence of probing occasions are transmitted using the same spatial filter, such as the same transmit beam. A pilot signal may be seen as a reference signal transmitted (e.g. between a transmitter node and a receiver node) e.g. for measurements, channel quality, synchronization, complex channel coefficients etc.

The method 100 may further comprise providing S101, to the receiver node, prior to transmitting the pilot signal, control information indicative of the polarization profile. In other words, the receiver node may be informed about which polarization profile will be used for an upcoming transmission of pilot signals.

In some embodiments, the method step of providing S101 control information indicative of the polarization profile may comprise transmitting S101A, e.g. by broadcasting, to the receiver node, the control information indicative of the polarization profile.

In some embodiments, the control information indicative of the polarization profile may be an index indicative of the polarization profile in a codebook stored in the receiver node. The code book may be standardised and hence known by both the receiver node and the transmitter node.

In some embodiments, the transmitter node may be a target radio network node in a handover and the step of providing S101 may comprise transmitting S101B, to the receiver node via the source radio network node, the control information indicative of the polarization profile of the transmitter node.

The method 100 may comprise repeating the transmitting S102 of the pilot signals in each of a plurality of mutually distinct transmission beams. Hence, if the transmitter node has a plurality of transmit beams, the transmitter node may transmit pilot signals according to the polarization profile, such as according to the N+M probing occasions, for each of the plurality of transmit beams.

Figure 3:
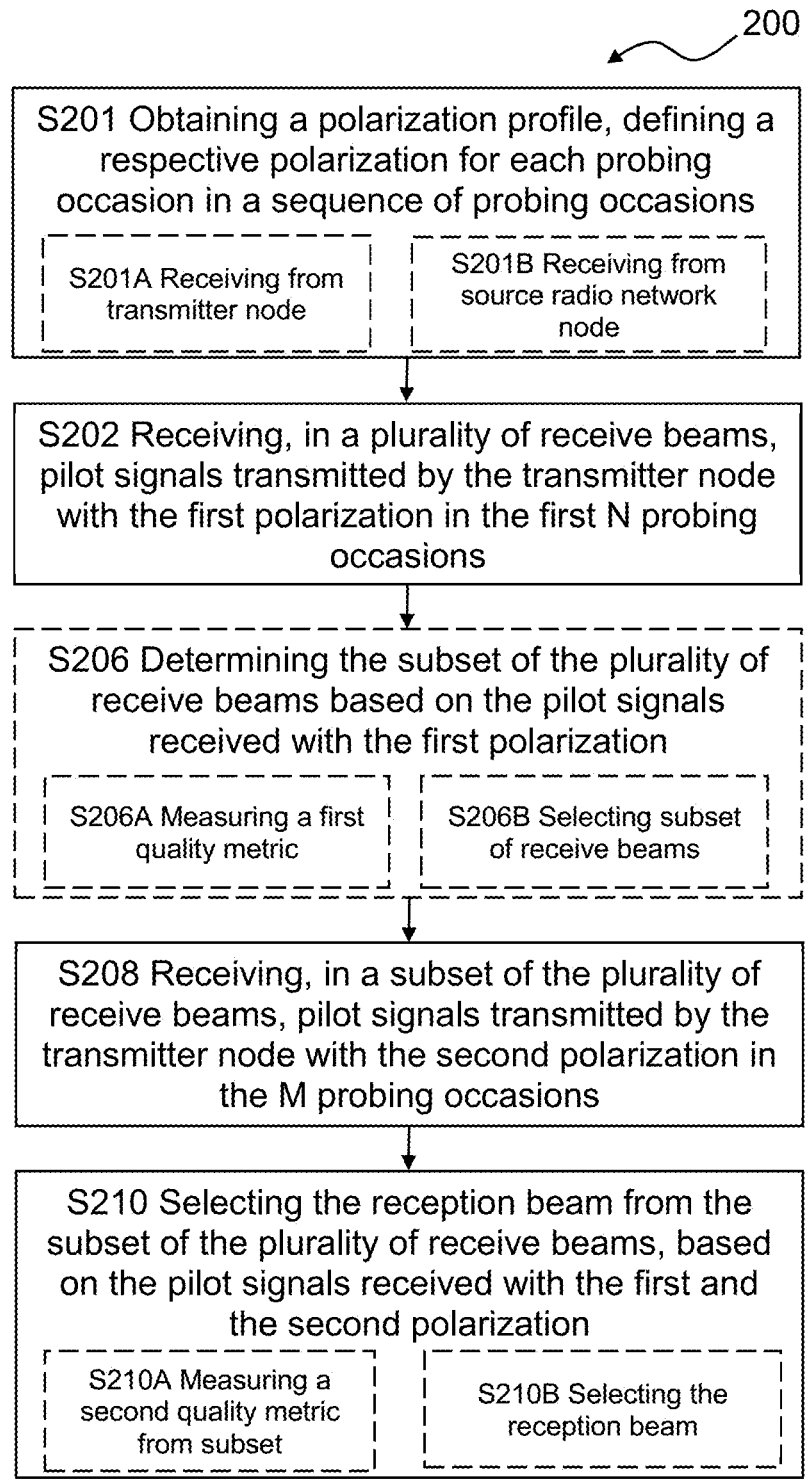
FIG. 3 is a flow-chart illustrating an exemplary method, performed in a receiver node of a wireless communication system, for selecting a reception beam to be used when communicating with the transmitter node.

FIG. 3 shows a flow diagram of an exemplary method 200, performed by a receiver node (e.g. a receiver node disclosed herein, e.g. receiver node 700), for selecting a reception beam to be used when communicating with a transmitter node (e.g. the transmitter node disclosed herein, e.g. transmitter node 500). The method 200 comprises obtaining S201 a polarization profile. The polarization profile defines a respective polarization for each probing occasion in a sequence of probing occasions used by the transmitter node for pilot signal transmission in one single transmission beam. The polarization profile defines a first polarization to be used in N first probing occasions and a second polarization to be used in M subsequent probing occasions, where M is smaller than N and M is non-zero. The first polarization may be different from the second polarization, such as e.g. orthogonal to the second polarization mode. In some embodiments the obtaining S201 may comprise receiving S201A, from the transmitter node, control information indicative of the polarization profile. The transmitter node may be providing the control information indicative of the polarization profile as in S101A, S101B of FIG. 2.

In some embodiments, the transmitter node may be a target radio network node and the step of obtaining S201 may comprise receiving S201B, from a source radio network node, the control information indicative of the polarization profile of the transmitter node. The transmitter node may be providing the control information indicative of the polarization profile as in S101, S101, S101B of FIG. 2.

In some embodiments, the polarization profile may be pre-defined, e.g. in a polarization codebook. The receiver node may obtain the polarization profile by e.g. retrieving the polarization profile from a memory, e.g. by selecting a profile from a polarization codebook. The polarization codebook may be stored on a memory accessible by the receiver node.

The receiver node may obtain the polarization profile by e.g. generating the polarization profile. This may be the case when the receiver node is a radio network node and the transmitter node is a wireless device. The polarization profile may be generated e.g. based on information regarding antenna arrays (e.g., number of elements, directionality of the radiation pattern), an environment (e.g., expected number of reflectors in a certain deployment environment), overall traffic load, or based on simulations of one or more realizations of a target environment in order to obtain the polarization profile, such as e.g. adjusting M and N. The obtaining of the polarization profile may also be based on past history.

The receiver node may also obtain the polarization profile from the transmitter node. This may e.g. be the case when the receiver node is a wireless device and the transmitter node is a radio network node.

In some embodiments, the method 200 may comprise providing S202, to the transmitter node, prior to receiving a pilot signal, control information indicative of the polarization profile to be used by the transmitter node. This may e.g. be the case when the receiver node is a wireless device and the transmitter node is a radio network node.

The method 200 comprises receiving S204, in a plurality of receive beams, pilot signals transmitted by the transmitter node with the first polarization in the first N probing occasions. The number of receive beams comprised in the plurality of receive beams may be smaller or equal to the number of probing occasions N for the transmission of pilot signals with the first polarization from the transmitter node. For example, the receiver node may receive the pilot signals transmitted by the transmitter node in S102 of FIG. 2.

The method 200 may comprise determining S206 a subset of the plurality of receive beams based on the pilot signals received with the first polarization. The number of receive beams in the subset of the plurality candidate beams may be smaller or equal to the number of probing occasions M for the transmission of pilot signals with the second polarization from the transmitter node.

In some embodiments, the step of determining S206 may comprise measuring S206A, for each of the plurality of receive beams a first quality metric associated with the first polarization and selecting S206B the subset of the plurality of receive beams based on the determined first quality metrics. The first quality metric is associated with the first polarization of the transmission from the transmitter node and may e.g. be a channel gain, a Received Signal Strength Indicator (RSSI), a Received Channel Power Indicator (RCPI), Signal to Interference plus Noise Ratio (SINR), Signal to Noise Ratio (SNR) and/or a Reference Signal Received Power (RSRP).

The method 200 comprises receiving S208, in a subset of the plurality of receive beams, pilot signals transmitted by the transmitter node with the second polarization in the M probing occasions. The subset of the plurality of receive beams may comprise one or more candidate reception beams determined based on the received pilot signals of the first polarization.

The method 200 comprises selecting S210 the reception beam from the subset of the plurality of receive beams, based on the pilot signals received with the first and the second polarization. In some embodiments the step of selecting S210 the reception beam from the subset of the plurality of receive beams may comprise measuring S210A for each receive beams of the subset of receive beams a second quality metric associated with the second polarization and selecting S210B the reception beam, based on the first quality metrics and the second quality metrics. The second quality metric is associated with the second polarization of the transmission from the transmitter node and may e.g. be a channel gain, a Received Signal Strength Indicator (RSSI), a Received Channel Power Indicator (RCPI), Signal to Interference plus Noise Ratio (SINR), Signal to Noise Ratio (SNR) and/or a Reference Signal Received Power (RSRP).

Figure 4:
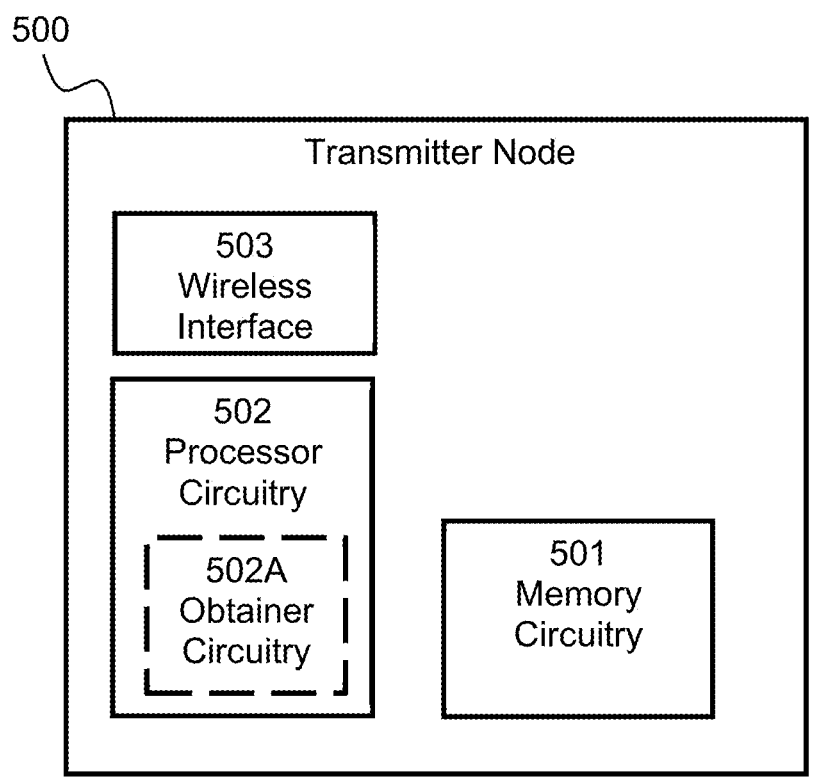
FIG. 4 is a block diagram illustrating an exemplary transmitter node according to this disclosure.

FIG. 4 shows a block diagram of an exemplary transmitter node 500 according to the disclosure. The transmitter node 500 comprises a memory circuitry 501, a processor circuitry 502, and a wireless interface 503. The transmitter node 500 may be configured to perform any of the methods disclosed in FIG. 2.

The transmitter node 500 is configured to communicate with a receiver node, such as the receiver node disclosed herein, using a wireless communication system. The wireless interface 503 is configured for wireless communications via a wireless communication system, such as a 3GPP system, such as a 3GPP system supporting 5G at millimeter wave frequencies.

The transmitter node 500 is configured to obtain (e.g. via the processor circuitry 502, e.g. via an obtainer circuitry 502A) a polarization profile. The polarization profile defines a respective polarization for a sequence of probing occasions. In other words, the polarization profile defines a polarization that is going to be used in each probing occasion of the sequence of probing occasions. In one or more embodiments, the transmitter node is a radio network node, such as an eNB, a gNB, an access point. In one or more embodiments, the transmitter node is a wireless device, such as a UE. The polarization profile defines a first polarization to be used in N probing occasions and a second polarization to be used in M probing occasions in the sequence of probing occasions, where M is smaller than N and M is non-zero. The N probing occasions in a first polarization may occur before the M probing occasion in the second polarization. The first polarization may be different from the second polarization.

The transmitter node 500 is configured to transmit (e.g. via the wireless interface 503) a pilot signal in each probing occasion of the sequence of probing occasions according to the polarization profile, in one single transmission beam. In other words, the transmitter node 500 is configured to transmit, using one single transmission beam, a pilot signal in each probing occasion of the sequence of probing occasions according to the polarization profile.

The transmitter node 500 may be configured to provide the control information indicative of the polarization profile e.g. by being configured to transmit (e.g. via the wireless interface 503), to the receiver node, the control information indicative of the polarization profile.

In some embodiments, the transmitter node 500 may be a target radio network node in a handover and the transmitter node 500 may be configured to provide the control information to the receiver node, optionally by being configured to transmit to the receiver node via a source radio network node, the control information indicative of the polarization profile of the transmitter node 500.

The transmitter node 500 may be configured to repeat the transmitting of the pilot signals in each of a plurality of mutually distinct transmission beams.

The transmitter node 500 may be configured to provide, to the receiver node, prior to transmitting the pilot signal, control information indicative of the polarization profile, e.g. by transmitting (e.g. via the wireless interface 503) control information indicative of the polarization profile.

The transmitter node 500 may be configured to repeat the transmitting (S102) of the pilot signals in each of a plurality of mutually distinct transmission beams The transmitter node 500 is configured to communicate with the receiver node using wireless communications systems such as cellular systems (e.g. millimeter wave communications).

The processor circuitry 502 is optionally configured to perform any of the operations disclosed in FIG. 2 (S101, S101A, S101B). The operations of the transmitter node 500 may be embodied in the form of executable logic routines (e.g., lines of code, software programs, etc.) that are stored on a non-transitory computer readable medium (e.g., the memory circuitry 501) and are executed by the processor circuitry 502).

Furthermore, the operations of the transmitter node 500 may be considered a method that the transmitter node 500 is configured to carry out. Also, while the described functions and operations may be implemented in software, such functionality may as well be carried out via dedicated hardware or firmware, or some combination of hardware, firmware and/or software.

The memory circuitry 501 may be one or more of a buffer, a flash memory, a hard drive, a removable media, a volatile memory, a non-volatile memory, a random access memory (RAM), or other suitable device. In a typical arrangement, the memory circuitry 501 may include a non-volatile memory for long term data storage and a volatile memory that functions as system memory for the processor circuitry 502. The memory circuitry 501 may exchange data with the processor circuitry 502 over a data bus. Control lines and an address bus between the memory circuitry 501 and the processor circuitry 502 also may be present (not shown in FIG. 4). The memory circuitry 501 is considered a non-transitory computer readable medium. The memory circuitry

501 may be configured to store the polarization profile in a part of the memory circuitry 501.

Figure 5:
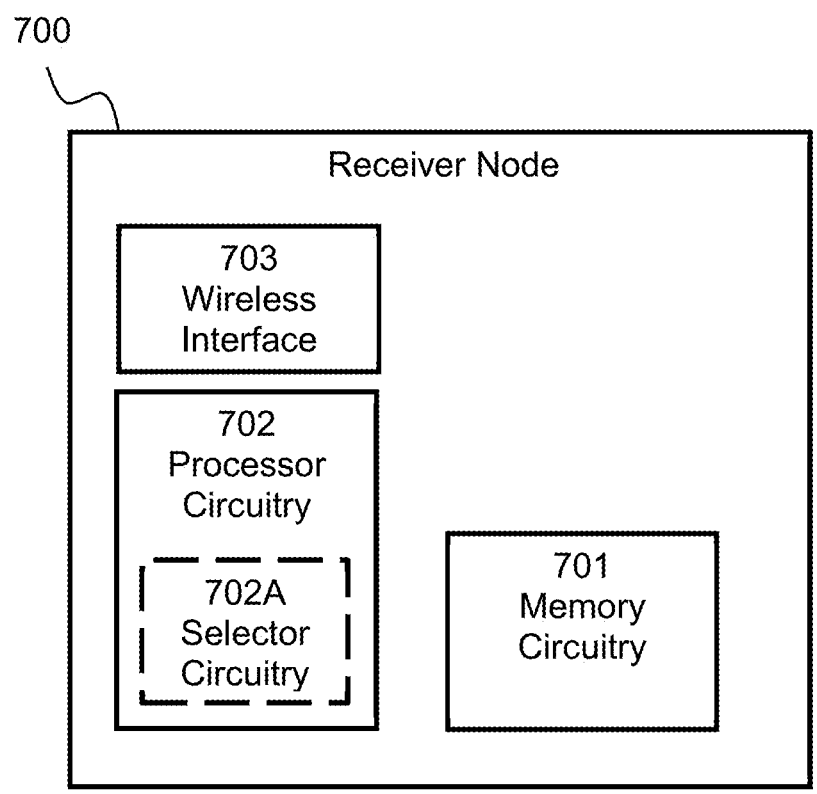
FIG. 5 is a block diagram illustrating an exemplary receiver node according to this disclosure.

FIG. 5 shows a block diagram of an exemplary receiver node 700 according to the disclosure. The receiver node 700 comprises a memory circuitry 701, a processor circuitry 702, and a wireless interface 703. The receiver node 700 may be configured to perform any of the methods disclosed in FIG. 3.

The receiver node 700 is configured to communicate with a transmitter node, such as the transmitter node 500 disclosed herein, using a wireless communication system. The wireless interface 703 is configured for wireless communications via a wireless communication system, such as a 3GPP system, such as a 3GPP system supporting millimeter wave communications.

The receiver node 700 is configured to obtain (e.g. using the processor circuitry 702) a polarization profile. The polarization profile defines (e.g. indicates, and/or comprises an indication of) a respective polarization for each probing occasion in a sequence of probing occasions used by the transmitter node for pilot signal transmission in one single transmission beam. The polarization profile defines a first polarization to be used in N first probing occasions and a second polarization to be used in M subsequent probing occasions; where M is smaller than N and M is non-zero. The first polarization may be different from the second polarization The receiver node 700 is configured to receive (e.g. via the wireless interface 703), in a plurality of receive beams, pilot signals transmitted by the transmitter node with the first polarization in the first N probing occasions.

The receiver node 700 is configured to receive (e.g. via the wireless interface 703), in a subset of the plurality of receive beams, pilot signals transmitted by the transmitter node with the second polarization in the M probing occasions.

The receiver node 700 is configured to select (e.g. via the processor circuitry 702, e.g. via a selector circuitry 702A) the reception beam from the subset of the plurality of receive beams, based on the pilot signals received with the first and the second polarization. For example, the subset of the plurality of receive beams comprises one or more candidate reception beams determined based on the received pilot signals of the first polarization The processor circuitry 702 is optionally configured to perform any of the operations disclosed in FIG. 3 (e.g. S206, S206A, S206B, S210A, S210B, S201A, S201B. The operations of the receiver node 700 may be embodied in the form of executable logic routines (e.g., lines of code, software programs, etc.) that are stored on a non-transitory computer readable medium (e.g., the memory circuitry 701) and are executed by the processor circuitry 702).

Furthermore, the operations of the receiver node 700 may be considered a method that the wireless circuitry is configured to carry out. Also, while the described functions and operations may be implemented in software, such functionality may as well be carried out via dedicated hardware or firmware, or some combination of hardware, firmware and/or software.

The memory circuitry 701 may be one or more of a buffer, a flash memory, a hard drive, a removable media, a volatile memory, a non-volatile memory, a random access memory (RAM), or other suitable device. In a typical arrangement, the memory circuitry 701 may include a non-volatile memory for long term data storage and a volatile memory that functions as system memory for the processor circuitry 703. The memory circuitry 701 may exchange data with the processor circuitry 702 over a data bus. Control lines and an address bus between the memory circuitry 701 and the processor circuitry 702 also may be present (not shown in FIG. 5). The memory circuitry 701 is considered a non-transitory computer readable medium.

The memory circuitry 701 may be configured to store the polarization profile in a part of the memory.

Figure 6:
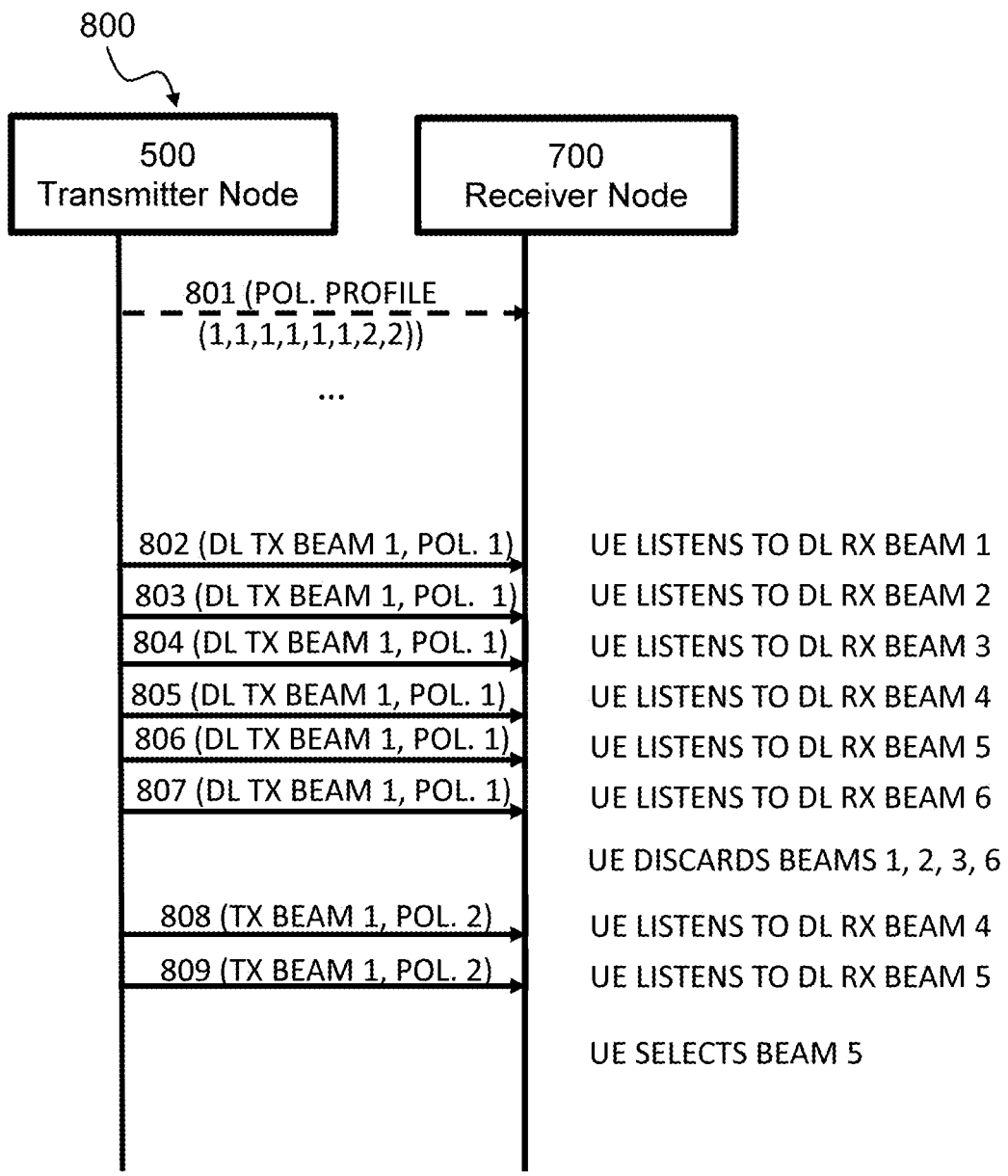
FIG. 6 is a signaling diagram illustrating an exemplary message exchange between an exemplary transmitter node, an exemplary receiver node.

FIG. 6 is a signaling diagram 800 illustrating an exemplary message exchange between an exemplary transmitter node 500, an exemplary receiver node 700. The signaling diagram 800 may illustrate a DL beam refinement with the disclosed technique.

The transmitter node 500 optionally transmits control signaling 801 indicative of the polarization profile to the receiver node 700 (e.g. downlink polarization profile). For example, the transmitter node 500 (e.g. a gNB) communicates to the receiver 700 (e.g. a UE) the polarization profile that the receiver node 700 can assume for DL beam refinement. For example, the polarization profile may be explicitly signaled (801) by the transmitter node 500 acting as a gNB some time before the DL beam refinement procedure takes place. The transmitter node 500 (e.g. a gNB) may use a fixed DL transmitter-side spatial filter during the entire duration of the probing procedure. For example, control signaling 801 may indicate a first polarization "1" to be used in N first probing occasions and a second polarization "2" to be used in M subsequent probing occasions. The receiver node 700 then monitors the channel for receiving pilot signals 802, 803, 804, 805, 806, and 807 transmitted by the transmitter node 500 with the first polarization in the first N probing occasions (N=6 in this example). The receiver node 700 receives the pilot signals 802, 803, 804, 805, 806, and 807 using beams 1, 2, 3, 4, 5, 6 respectively on corresponding probing occasions. For example, the receiver node 700 (e.g. the UE) listens to the transmitter node 500 (e.g. gNB) using DL beams (e.g. DL receiver-side spatial filter) candidates 1, 2, 3, 4, 5, and 6 in different time and/or frequency slots. The receiver node 700 (e.g. the UE) is aware of the polarization profile used by the transmitter node 500 (e.g. gNB) and knows that the number of probing occasions for polarization mode 2 is smaller than those for polarization mode 1.

The receiver node 700 evaluates the receive beams and selects a subset of the beams as one or more candidate reception beams determined based on the received pilot signals of the first polarization. For example, the receiver node 700 (e.g. UE) discards beam candidates (e.g. spatial filter candidates) 1, 2, 3, and 6 and listen only to spatial filter candidates 4 and 5. Finally, the receiver node 700 (e.g. UE) selects DL beam 5 (e.g. DL receiver-side filter candidate 5). In other words, the polarization profile has been designed such that the beam selection decision is near-optimal, even though the number of probing occasions in one polarization mode is different from the other mode. It may be appreciated that the beam refinement procedure disclosed herein is shorter than the one illustrated in FIG. 1, where the beam refinement procedure takes longer time since polarization modes 1 and 2 are probed by the receiver node 700 for all DL receiver-side spatial filter candidates.

The receiver node 700 monitors the M probing occasions (M=2 in this example), and receives pilot signals 808, 809 over beams 4 and 5 which are the candidate reception beams determined based on the received pilot signals of the first polarization (such as based on second quality metric(s) associated with the second polarization (e.g. associated with pilot signals 908, 909)).

The receiver node 700 is then capable of selecting the reception beam from the subset of the plurality of receive beams, based on the pilot signals received with the first and the second polarization.

Figure 7:
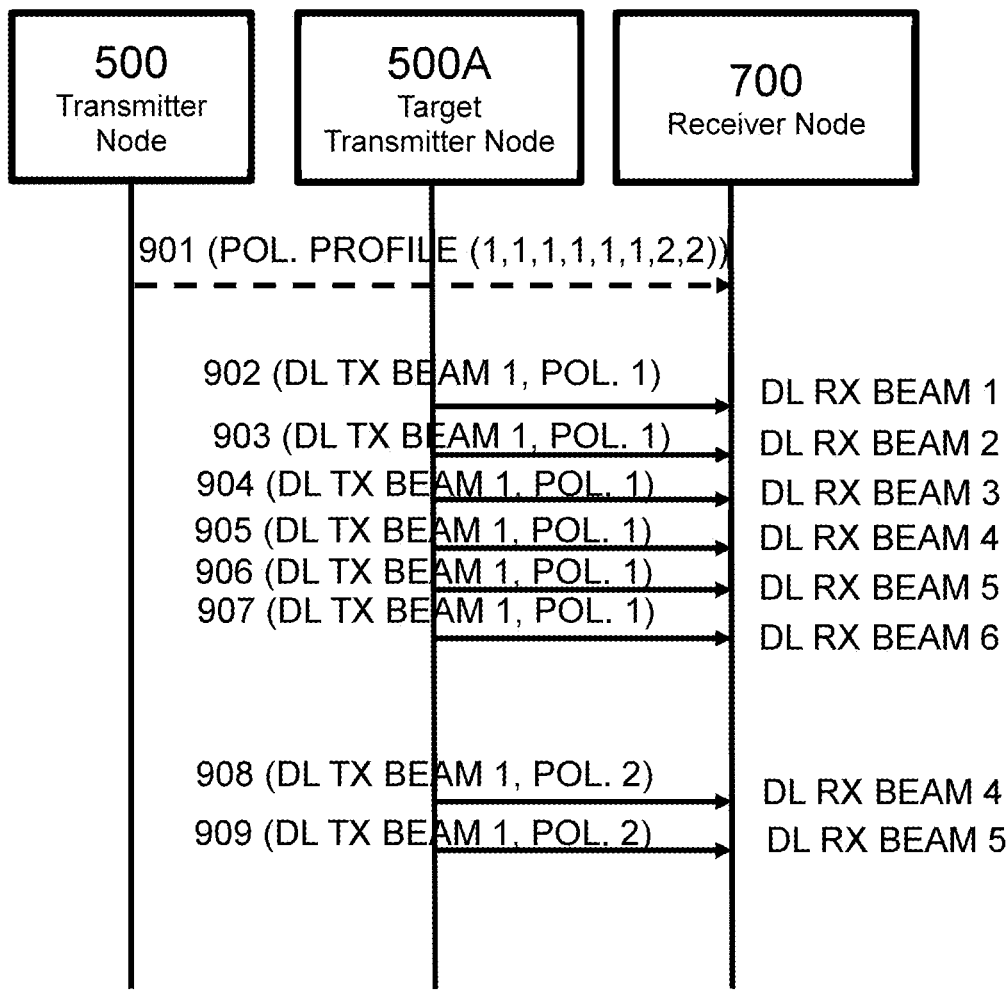
FIG. 7 is a signaling diagram illustrating an exemplary message exchange between an exemplary source transmitter node, an exemplary target transmitter node, and an exemplary receiver node.

FIG. 7 is a signaling diagram 900 illustrating an exemplary message exchange between an exemplary source transmitter node 500, an exemplary target transmitter node 500A, and an exemplary receiver node 700, e.g. in a handover scenario. For example, the receiver node 700 is moving out of the coverage or cell of the source transmitter node 500, and into the coverage or cell of the target transmitter node 500A. This may be beneficial for initial access with the disclosed technique. For example, it may be assumed that the receiver node 700 (e.g. UE) is in connected mode with the source transmitter node 500 acting as e.g. a first gNB, and that a possible handover to the target transmitter node 500A acting as e.g. a second gNB is being prepared. The procedure may be seen as similar to the one illustrated in FIG. 6, with the difference that now the polarization profile used by transmitter node (e.g. the second gNB) is communicated to the receiver node 700 (e.g. UE) by the source transmitter node 500 (e.g. the first gNB).

To facilitate the handover, the target transmitter node 500A may transmit, to the receiver node 700 via a source radio network node 500, control information (via control signalling 901) indicative of the polarization profile of the target transmitter node 500A. This way, the polarization profile may be signaled from the target transmitter node 500A to the receiver node 700 for handover.

For example, control signaling 901 may indicate a first polarization "1" to be used in N first probing occasions and a second polarization "2" to be used in M subsequent probing occasions. The receiver node 700 then monitors the channel for receiving pilot signals 902, 903, 904, 905, 906, and 907 transmitted by the transmitter node 500A with the first polarization in the first N probing occasions (N=6 in this example). The receiver node 700 receives the pilot signals 902, 903, 904, 905, 906, and 907 using beams 1, 2, 3, 4, 5, 6 respectively on corresponding probing occasions. For example, the receiver node 700 (e.g. the UE) listens to the transmitter node 500A (e.g. gNB) using DL beams (e.g. DL receiver-side spatial filter) candidates 1, 2, 3, 4, 5, and 6 in different time and/or frequency slots. The receiver node 700 (e.g. the UE) is aware of the polarization profile used by the transmitter node 500A (e.g. gNB) thanks to 901 and knows that the number of probing occasions for polarization mode 2 is smaller than those for polarization mode 1.

The receiver node 700 evaluates the receive beams and selects a subset of the beams as one or more candidate reception beams determined based on the received pilot signals of the first polarization, e.g. a first quality metric associated with the first polarization. For example, the receiver node 700 (e.g. UE) discards beam candidates (e.g. spatial filter candidates) 1, 2, 3, and 6 based on a first quality metric associated with the first polarization and listen only to spatial filter candidates 4 and 5. Finally, the receiver node 700 (e.g. UE) selects DL beam 5 (e.g. DL receiver-side filter candidate 5) based on second quality metric(s) associated with the second polarization (e.g. associated with pilot signals 908, 909). In other words, the polarization profile has been designed such that the beam selection decision is near-optimal, even though the number of probing occasions in one polarization mode is different from the other mode.

Embodiments of methods and products (transmitter node and receiver node) according to the disclosure are set out in the following items:

Item 1. A method, performed by a transmitter node, for enabling reception beam selection at one or more receiver nodes, the method comprising:
- obtaining (S100) a polarization profile, wherein the polarization profile defines a respective polarization for a sequence of probing occasions,
- transmitting (S102), a pilot signal in each probing occasion of the sequence of probing occasions according to the polarization profile, in one single transmission beam;
- wherein the polarization profile defines a first polarization to be used in N probing occasions and a second polarization to be used in M probing occasions in the sequence of probing occasions, where M is smaller than N and M is non-zero.

Item 2. The method according to item 1, wherein the method further comprises:
- providing (S101), to the receiver node, prior to transmitting the pilot signal, control information indicative of the polarization profile.

Item 3. The method according to item 2, wherein providing (S101) comprises transmitting (S101A), to the receiver node, control information indicative of the polarization profile.

Item 4. The method according to item 2, wherein the transmitter node is a target radio network node in a handover and wherein the providing (S101) comprises transmitting (S101B), to the receiver node via a source radio network node, the control information indicative of the polarization profile of the transmitter node.

Item 5. The method according to any of the previous items, wherein the N probing occasions in a first polarization occur before the M probing occasion in the second polarization.

Item 6. The method according to any of the previous items, the method comprising repeating the transmitting (S102) of the pilot signals in each of a plurality of mutually distinct transmission beams.

Item 7. The method according to any of the previous items, wherein the first polarization is different from the second polarization.

Item 8. A method, performed by a receiver node, for selecting a reception beam to be used when communicating with a transmitter node, the method comprising:
- obtaining (S201) a polarization profile, defining a respective polarization for each probing occasion in a sequence of probing occasions used by the transmitter node for pilot signal transmission in one single transmission beam, wherein the polarization profile defines a first polarization to be used in N first probing occasions and a second polarization to be used in M subsequent probing occasions; where M is smaller than N and M is non-zero;
- receiving (S204), in a plurality of receive beams, pilot signals transmitted by the transmitter node with the first polarization in the first N probing occasions;
- receiving (S208), in a subset of the plurality of receive beams, pilot signals transmitted by the transmitter node with the second polarization in the M probing occasions, and
- selecting (S210) the reception beam from the subset of the plurality of receive beams, based on the pilot signals received with the first and the second polarization.

Item 9. The method according to item 8, wherein the subset of the plurality of receive beams comprises one or more candidate reception beams determined based on the received pilot signals of the first polarization.

Item 10. The method according to item 8 or 9, wherein the method further comprises:
 determining (S206) the subset of the plurality of receive beams based on the pilot signals received with the first polarization.

Item 11. The method according to any of the item 8 to item 10, wherein the determining (S206) comprises measuring (S206A), for each of the plurality of receive beams a first quality metric associated with the first polarization and selecting (S206B) the subset of the plurality of receive beams based on the determined first quality metrics.

Item 12. The method according to item 11, wherein the selecting (S210) comprises measuring (S210A) for each receive beams of the subset of receive beams a second quality metric associated with the second polarization and selecting (S210B) the reception beam, based on the first quality metrics and the second quality metrics.

Item 13. The method according to any of the items 8 to 12, wherein the obtaining (S201) comprises receiving (S201A), from the transmitter node, control information indicative of the polarization profile.

Item 14. The method according to any of the items 8 to 12, wherein the transmitter node is a target radio network node and wherein the obtaining (S201) comprises receiving (S201B), from a source radio network node, the control information indicative of the polarization profile of the transmitter node.

Item 15. The method according to any of items 8 to 14, and where the first polarization is different from the second polarization.

Item 16. The method according to any of items 8 to 15, wherein the method further comprises providing (S202), to the transmitter node, prior to receiving the pilot signal, control information indicative of the polarization profile to be used by the transmitter node.

Item 17. A transmitter node comprising a memory module, a processor module, and a wireless interface, wherein the transmitter node is configured to perform any of the methods according to any of items 1-7.

Item 18. A receiver node comprising a memory module, a processor module, and a wireless interface, wherein the receiver node is configured to perform any of the methods according to any of items 8-16.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-7 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed by a transmitter node, for enabling reception beam selection at one or more receiver nodes, the method comprising:
 obtaining a polarization profile, wherein the polarization profile defines a respective polarization for a sequence of probing occasions,
 providing, to the receiver node, control information indicative of the polarization profile,
 transmitting, in one single transmission beam, a pilot signal having a first polarization, in each of N probing occasions, wherein N is defined by the polarization profile;
 transmitting, subsequent to transmission of the pilot signals having the first polarization, and in one single transmission beam, a pilot signal having a second polarization, in each of M probing occasions, wherein M is defined by the polarization profile; and
 wherein M is smaller than N and M is non-zero.

2. The method according to claim 1, wherein providing comprises transmitting, to the receiver node, control information indicative of the polarization profile.

3. The method according to claim 1, wherein the transmitter node is a target radio network node in a handover and wherein the providing comprises transmitting, to the receiver node via a source radio network node, the control information indicative of the polarization profile of the transmitter node.

4. The method according to claim 1, wherein the N probing occasions in a first polarization occur before the M probing occasion in the second polarization.

5. The method according to claim 1, the method comprising repeating the transmitting of the pilot signals in each of a plurality of mutually distinct transmission beams.

6. The method according to claim 1, wherein the first polarization is different from the second polarization.

7. A transmitter node comprising a memory module, a processor module, and a wireless interface, wherein the transmitter node is configured to perform the method of claim 1.

8. A method, performed by a receiver node, for selecting a reception beam to be used when communicating with a transmitter node, the method comprising:
  obtaining a polarization profile, defining a respective polarization for each probing occasion in a sequence of probing occasions used by the transmitter node for pilot signal transmission in one single transmission beam, wherein the polarization profile defines a first polarization to be used in N first probing occasions and a second polarization to be used in M subsequent probing occasions; where M is smaller than N and M is non-zero;
  receiving, in a plurality of receive beams, pilot signals transmitted by the transmitter node with the first polarization in the first N probing occasions;
  determining a subset of the plurality of receive beams based on the received pilot signals of the first polarization;
  receiving, in the subset of the plurality of receive beams, pilot signals transmitted by the transmitter node with the second polarization in the M probing occasions, and
  selecting the reception beam from the subset of the plurality of receive beams, based on the pilot signals received with the first and the second polarization.

9. The method according to claim 8, wherein the subset of the plurality of receive beams comprises one or more candidate reception beams determined based on the received pilot signals of the first polarization.

10. The method according to claim 8, wherein the determining comprises measuring, for each of the plurality of receive beams a first quality metric associated with the first polarization and selecting the subset of the plurality of receive beams based on the determined first quality metrics.

11. The method according to claim 8, wherein the selecting comprises measuring for each receive beams of the subset of receive beams a second quality metric associated with the second polarization and selecting the reception beam, based on the first quality metrics and the second quality metrics.

12. The method according to claim 8, wherein the obtaining comprises receiving, from the transmitter node, control information indicative of the polarization profile.

13. The method according to claim 8, wherein the transmitter node is a target radio network node and wherein the obtaining comprises receiving, from a source radio network node, the control information indicative of the polarization profile of the transmitter node.

14. The method according to claim 8, and where the first polarization is different from the second polarization.

15. The method according to claim 8, wherein the method further comprises providing, to the transmitter node, prior to receiving the pilot signal, control information indicative of the polarization profile to be used by the transmitter node.

16. A receiver node comprising a memory module, a processor module, and a wireless interface, wherein the receiver node is configured to perform the method of claim 8.

* * * * *